No. 808,405. PATENTED DEC. 26, 1905.
E. SCHMITZ.
WHEEL RIM.
APPLICATION FILED JUNE 26, 1905.
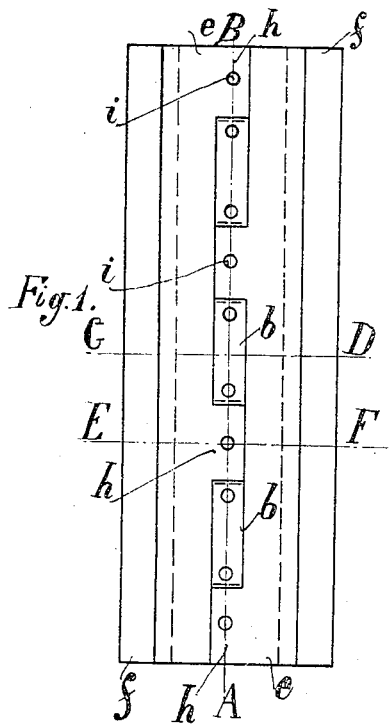
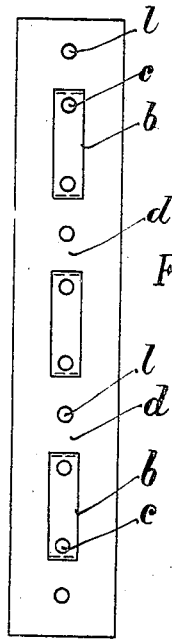
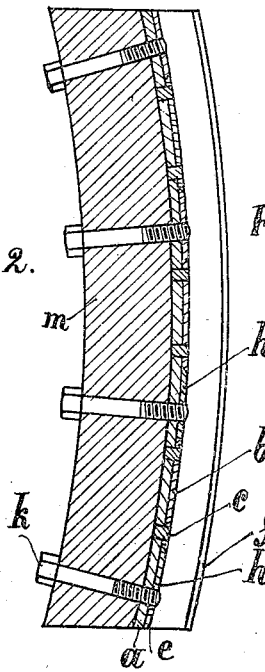
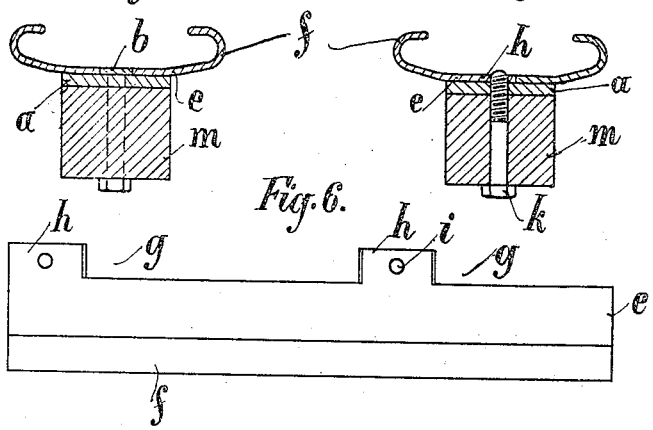
WITNESSES:
INVENTOR
Edward Schmitz
BY L. K. Böhm,
his ATTORNEY.

UNITED STATES PATENT OFFICE.

EDUARD SCHMITZ, OF COLOGNE, GERMANY.

WHEEL-RIM.

No. 808,405.  Specification of Letters Patent.  Patented Dec. 26, 1905.

Application filed June 26, 1905. Serial No. 266,952.

*To all whom it may concern:*

Be it known that I, EDUARD SCHMITZ, a citizen of the Empire of Germany, residing at Cologne, in the Province of the Rhine and Kingdom of Prussia, Germany, have invented certain new and useful Improvements in Wheel-Rims for Road-Vehicles, of which the following is a specification.

This invention relates to rims for wheels with pneumatic tires and detachable tire-holders the construction of which differs from that of known rims in that the fitting of the holders can be readily effected notwithstanding contraction or warping of the felly.

My invention is illustrated in the accompanying drawings, in which—

Figure 1 represents in elevation part of a rim which embodies my invention. Fig. 2 illustrates same without the tire-holders. Figs. 3, 4, and 5 are sections on lines A B, C D, and E F of Fig. 1; and Fig. 6 shows a tire-holder.

Similar letters of reference denote like parts in all the figures.

The construction of my novel wheel-rim is as follows: On the hoop $a$ of the wheel oblong raised portions $b$ are arranged, which are either formed in one piece with the hoop or are immovably fixed thereon by means of rivets $c$ or in any other suitable manner. The narrow edges of the raised portions $b$ taper downward, so that by means of the opposite lying edges of each two raised portions dovetail guides are formed at the extremities of the gaps $d$, between the raised portions $b$. The hoop $a$ also acts as a support for the tire-holders, which consist of curved plates $e$, adapted to lie on the hoop $a$ and formed with curved edges $f$, the plates forming a channel for the tire when laid side by side.

The rim-plates $e$ are formed with perforated lateral projections $h$, with recesses $g$ between them, the length of such recesses being equal to the distance between the farther extremities of each two raised portions $b$, so that the projections $h$ on opposite plates may be so adjusted in the gaps $d$ that the projections $h$ of the one tire-holder alternate with those of the other in the order of succession. These projections are beveled at the edges to take into the dovetailed sides of the gaps $d$. The openings $i$ in the parts $h$ are furnished with screw-threads, and the tire-holders are fixed by means of screw-bolts $k$, which pass through borings $l$ in the hoop $a$, and thereby at the same time secure this to the felly $m$.

Having thus described my invention, I claim as new and desire to secure by Letters Patent—

A rim for wheels with detachable pneumatic-tire holders comprising a hoop fixed to the felly and provided with oblong raised portions forming gaps or spaces between them with dovetail edges, a detachable tire-holder formed of plates with curved edges arranged to be secured in position side by side to form a channel for receiving the tire, lateral projections on the channel-plates arranged to fit into alternate gaps between the raised portions of the hoop, and bolts screwing from the inside of the rim through the felly, hoop and channel-plates and securing the whole together.

In testimony whereof I have hereunto affixed my signature in the presence of two witnesses.

EDUARD SCHMITZ.

In presence of—
WILLIAM THUEPPERS,
JOH. SELWELZ.